Figure 1:
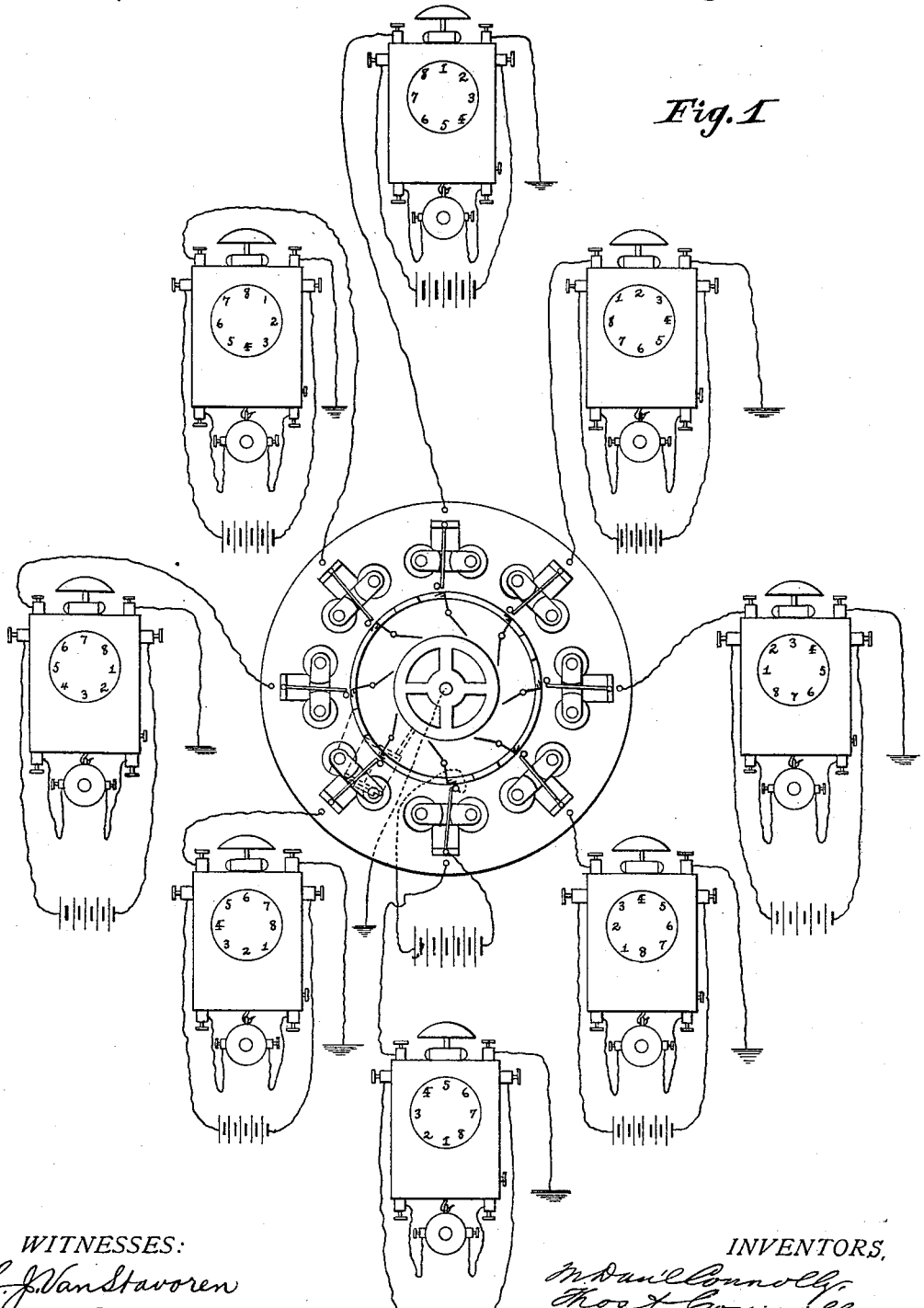

(No Model.) 6 Sheets—Sheet 1.
M. D. & T. A. CONNOLLY, & T. J. McTIGHE.
AUTOMATIC TELEPHONE EXCHANGE.

No. 262,645. Patented Aug. 15, 1882.

WITNESSES: INVENTORS,

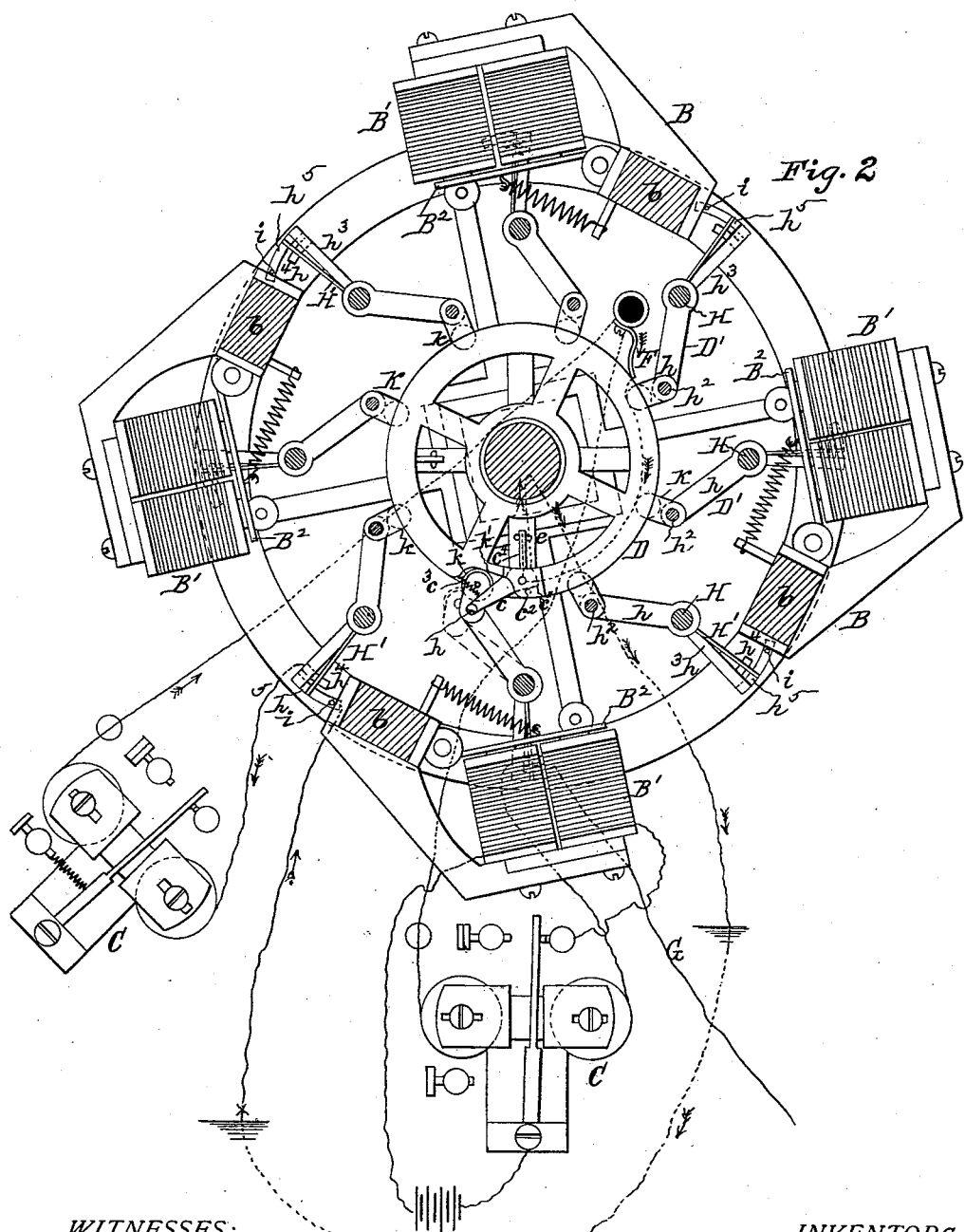

(No Model.) 6 Sheets—Sheet 3.
M. D. & T. A. CONNOLLY, & T. J. McTIGHE.
AUTOMATIC TELEPHONE EXCHANGE.
No. 262,645. Patented Aug. 15, 1882.
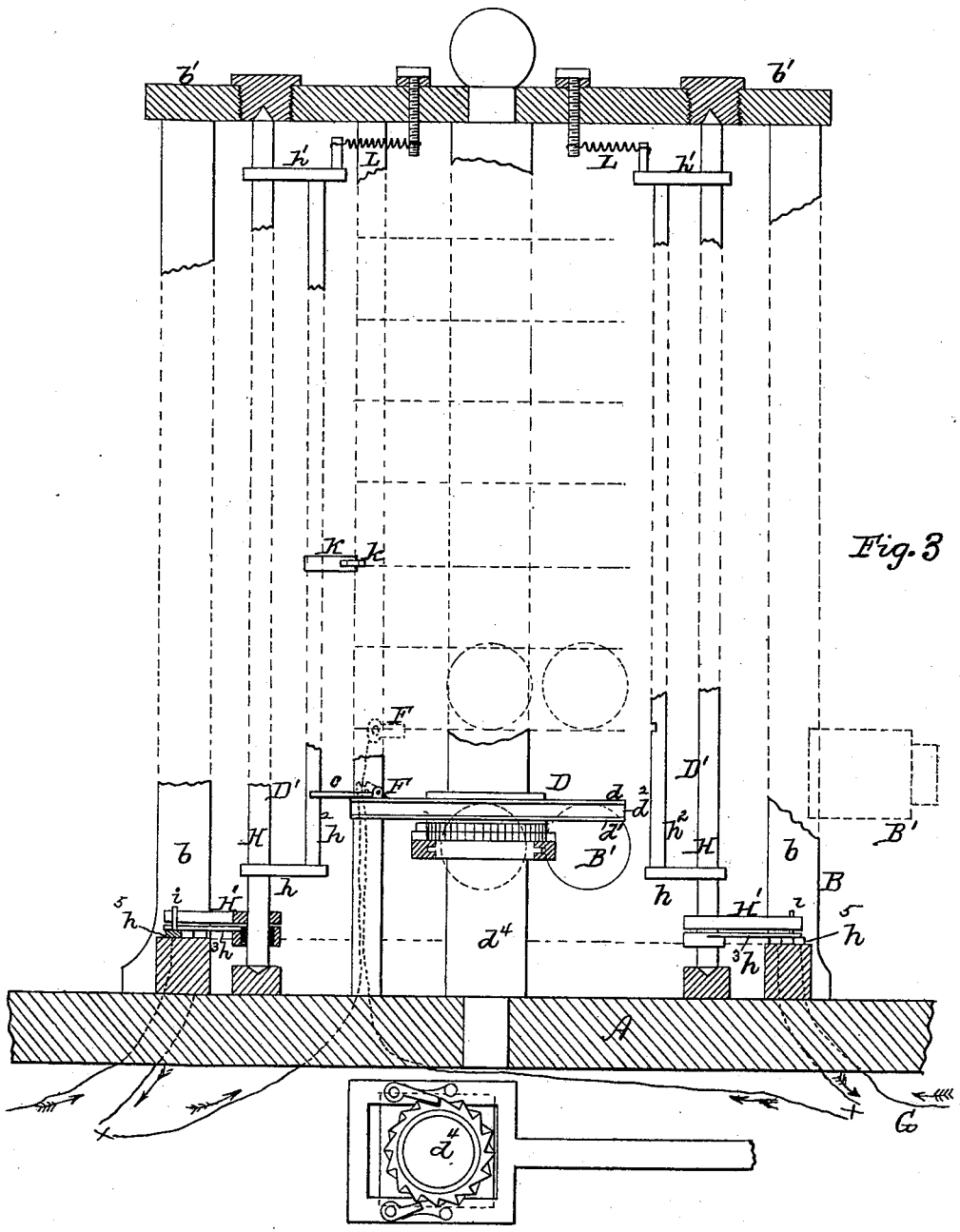

(No Model.) 6 Sheets—Sheet 4.
M. D. & T. A. CONNOLLY, & T. J. McTIGHE.
AUTOMATIC TELEPHONE EXCHANGE.
No. 262,645. Patented Aug. 15, 1882.
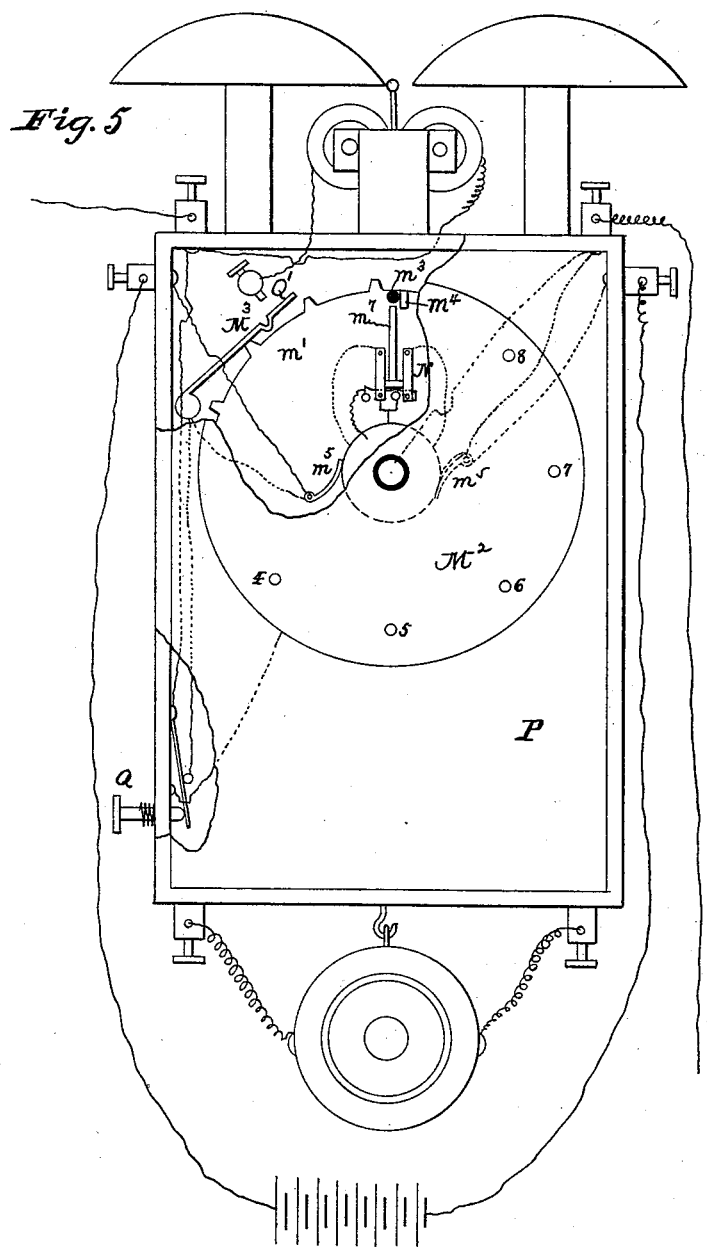
WITNESSES:
S. J. Van Stavoren
Jos B Connolly
INVENTORS,
M Dan'l Connolly
Thos A Connolly
Thos J McTighe
By Connolly Bros,
ATTORNEYS

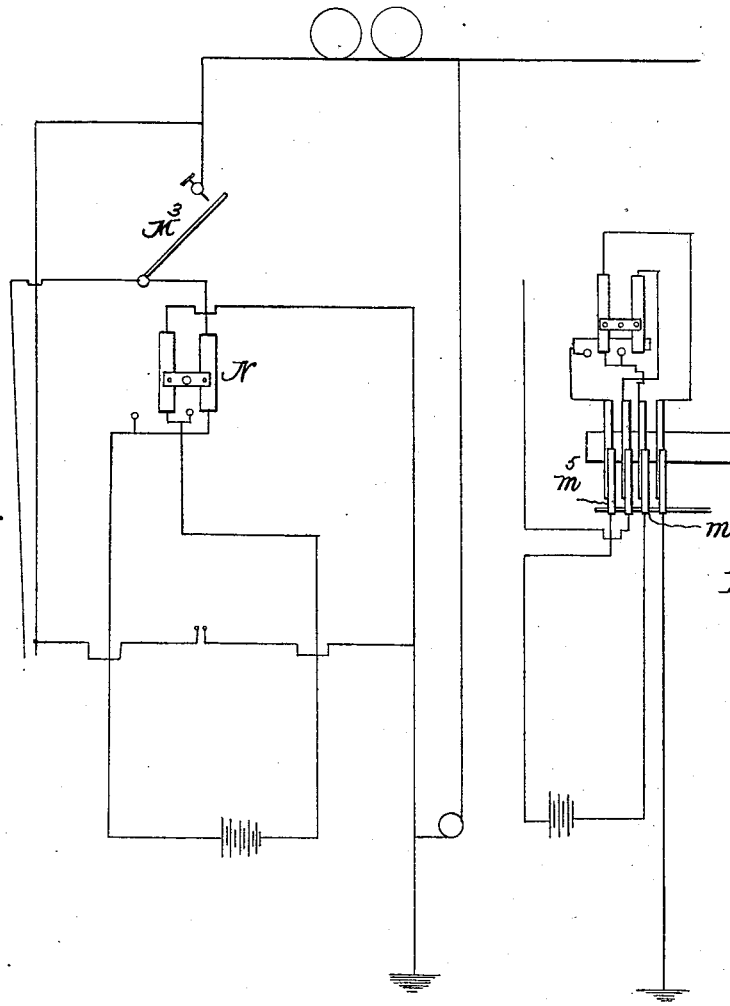

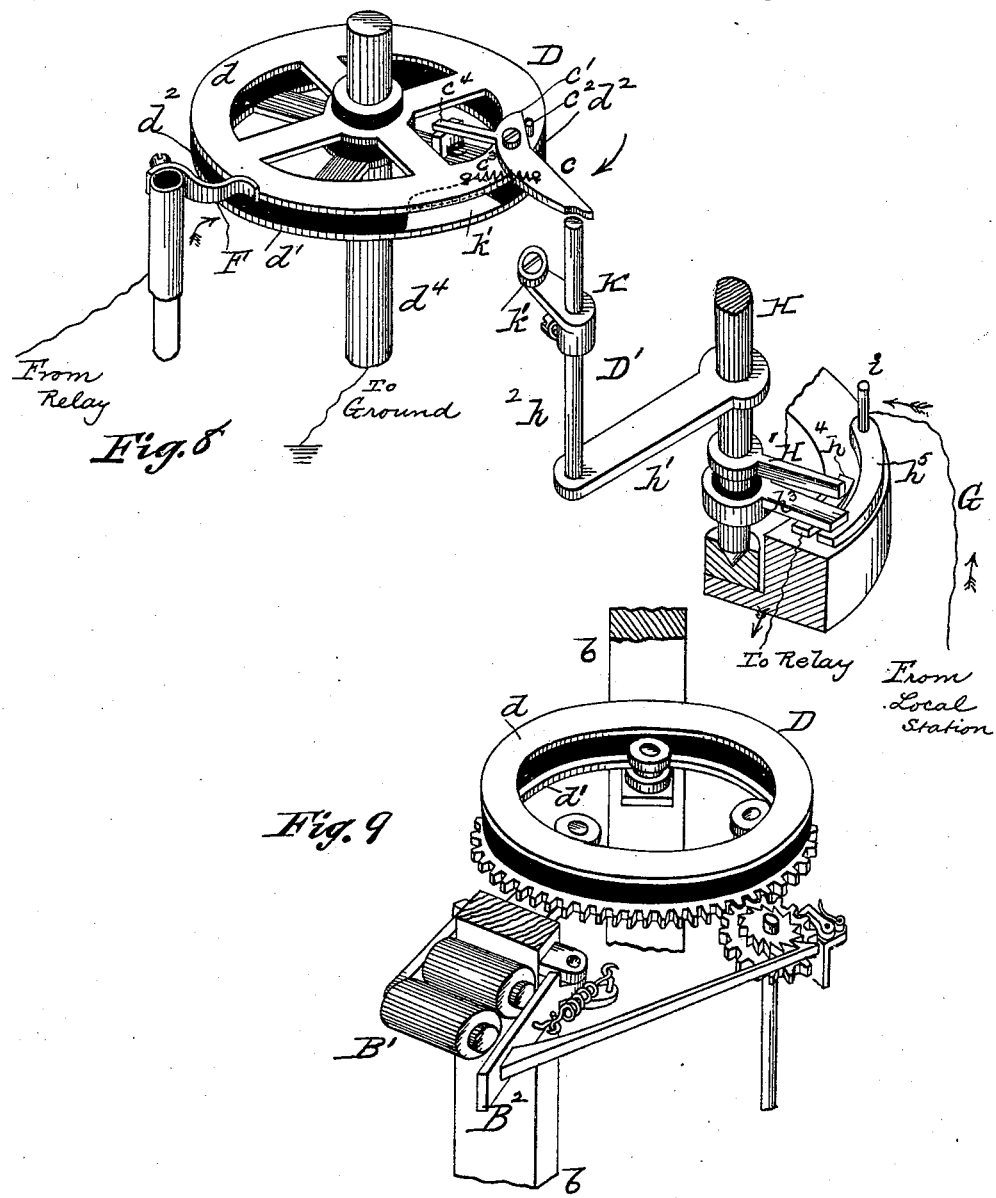

UNITED STATES PATENT OFFICE.

M. DANIEL CONNOLLY, OF PHILADELPHIA, PA., THOMAS A. CONNOLLY, OF WASHINGTON, D. C., AND THOMAS J. McTIGHE, OF PITTSBURG, PA., ASSIGNORS TO SPENCER D. SCHUYLER, OF NEW YORK, N. Y.

AUTOMATIC TELEPHONE-EXCHANGE.

SPECIFICATION forming part of Letters Patent No. 262,645, dated August 15, 1882.

Application filed August 29, 1881. (No model.)

*To all whom it may concern:*

Be it known that we, M. DANIEL CONNOLLY, of Philadelphia, in the State of Pennsylvania, THOS. A. CONNOLLY, of the city of Washington, D. C., and THOS. J. McTIGHE, of Pittsburg, Pennsylvania, citizens of the United States, have invented certain Improvements in Automatic Telephonic Exchanges, of which the following is a specification, reference being had to the accompanying drawings, wherein—

Figure 1 is a diagram of an exchange complete. Fig. 2 is a horizontal section of central machine. Fig. 3 is an elevation, partly in section, of the same. Fig. 4 is a detail view of preferable form of pawl and ratchet for central-office-mechanism operations. Fig. 5 is an elevation of subscriber's box. Fig. 6 is a diagram of box-circuits. Fig. 7 is a diagram of box-circuits, showing circuit-making wheels or disks and brushes leading to and from reversing-key. Fig. 8 is a detail perspective of traveling wheel, its brush or rubber, contact-bar or frame, and appurtenances. Fig. 9 is a perspective of a modification, showing traveling ring and means for rotating the same.

The object of our invention is to provide means whereby in a telephonic exchange the operations of the central office are performed automatically, so that the subscribers or members of the exchange may individually effect the requisite connection and disconnection of the lines, thereby avoiding the necessity of calling the central office and having the service performed by manual labor, as is now customary.

A telephone-exchange based on our system and embodying our invention comprises a central machine or apparatus operated or controlled by electro-magnetism, a series of subscribers' or members' stations provided with devices for effecting such operation or control of the central machine, and lines or conductors leading from the stations to the central machine for the transmission of the currents from stations to central office and for intercommunication of stations connected through said central office. The subscribers' stations are also provided with telephonic apparatus and suitable devices for receiving and sending signals. We have contrived a variety of electro-mechanical combinations for accomplishing our aim, all depending on the same substantial principle. Some of these we have illustrated in the accompanying drawings, and we will describe them in order.

As regards the plan shown in Figs. 1, 2, &c:

*The central apparatus.*—This consists of a machine of an upright cylindrical form, resting on a base, A, in which are fitted the binding-posts for the various conveying wires. B designates the main frame of a machine, consisting chiefly of the uprights $b$ and the cap $b'$. To these uprights are attached the electro-magnets $B'$, having pivoted armatures $B^2$, to which are connected escapements or ratchet-and-pawl devices for converting the motion of the armatures into intermittent rotary motion of a suitable ratchet-wheel or rack. The magnets $B'$ are energized from a main battery or generator located at the central office of the exchange. There may be a separate battery at the central office for each such magnet, or by "splitting" the main battery or generator all of the said magnets may be energized from one common source. Normally the circuits of said magnets are open. The closing is effected by means of relays C in the normal circuits of the subscribers' or members' lines. These relays are responsive to the impulses transmitted from the subscribers' stations. Hence each vibration of an armature, $B^2$, is in keeping or correspondence with that of its relay. These relays are polarized, and preferably of the form known as "Siemens' polarized relays," and are adapted to close the circuit of the magnets $B'$ under one direction only of the current energizing said relay, so that the current in the reverse direction may be utilized for signaling purposes without effecting any operation of the central office machine. The magnets $B'$ and their ratchet appliances are employed to effect the rotation of the rings or wheels D, one of which is allotted to each line. In addition to a ring, each line possesses a "contact-bar" or frame, $D'$. These frames are pivoted either inside or outside the ring or outside of the wheel. They are arranged at regular intervals around the rings, and are parallel with the axis thereof. Each bar traverses the whole series of rings, so that all the rings have a like relation to each and every frame. A connection of any two lines is effected through the ring of the operating or calling line and the contact-bar or frame of the called line. For this purpose each ring is furnished with a coupling or connecting device, which in the plan under consideration consists of a "tripper" or toggle-lever, $c$, which, as a ring rotates, contacts with the several frames, and swings or moves the same on their shafts or bearings. At the same time the tripper or toggle, which is normally tangential or inclined with reference to the periphery of the ring, assumes a more nearly radial position, and if then the movement of the ring is discontinued the tripper and frame remain in their conjointly assumed positions. The object of moving the frame as stated is to isolate it, so that when engaged by a line no other line can obtain connection with it. For this purpose the conditions are such that in its normal position the outer end or head of the tripper does not project sufficiently far beyond the ring or wheel to touch the frame or contact-bar, which is already engaged by another tripper or toggle. A line when not in use or when employed in effecting connection with another completes its circuit to earth or to a common ground or return through its tripper or toggle. When engagement is made with a line this ground or earth connection is broken by the movement of the tripper in engagement with a frame, and the circuit is completed through the line in which such frame is located. More specifically, each ring or wheel consists of two plates or rings of metal, $d\ d'$, separated by an insulating-filling, $d^2$. The lower plate is in constant contact with the frame of the central machine, which communicates with earth or common ground or return wire either through supporting-rollers, if a hollow ring is used, or through a central shaft, $d^4$, if a wheel with spokes be the form. If the ring form be used, the lower plate may be formed with gear-teeth on its periphery engaging with a pinion, which is driven by the magnet $B'$ and its appurtenances; or the dog and pawl connected to the armature may engage directly with the lower plate, which will then have its teeth suitably beveled. The same plan of operations may be adopted if a wheel be substituted for a ring; but in this case it is preferable to operate the wheel from the magnet through a ratchet-wheel on the central shaft secured to the main wheel. It is not, however, of the essence of the invention that the form of the wheel or ring, or the mechanism for imparting motion to the same, should be of any particular nature. Various contrivances adapted to the purpose will suggest themselves to a skillful constructer, and are within the compass of our invention.

The tripper or toggle-lever $c$ consists of a finger pivoted to the upper plate of the ring or wheel and formed with a shoulder, $c'$, abutting against a stop, $c^2$, which limits its movement in one direction, and against which the tripper is held in impingement, when not engaging with a contact-frame, by an easily-yielding spring, $c^3$. A spring tail-piece or continuation, $c^4$, of the tripper or toggle contacts with a bent metal pin, stud, or block, $e$, rising from the lower plate of the ring or wheel, and travels thereon during a portion of the movement of the tripper on its pivot. Thus the operating-line, which leads into the upper plate and thence to the tripper or toggle, makes ground through said pin, stud, or block until, in engaging with a contact-frame, such ground connection or contact is broken by the tail-piece leaving the same, when the circuit is diverted into the contact-frame, to be thence led to the line thereof. As stated, the tripper or toggle lies normally in an oblique or tangential position, as shown. Its outer end is formed with a slight concavity or recess, by which a contact-frame in its path is caught and held in effecting and maintaining engagement therewith. As the tripper passes each unoccupied contact-frame momentary engagement and conjoint movement ensue, and the diversion of the circuit from the central ground to line of the engaged frame follows. The main-line wire G from a station leads direct to a binding-post on the base and thence to connections in the central machine, which will be hereinafter described; thence to the relay, and from latter by return to a brush or rubber, F, insulated from the main frame and in contact with the upper section or plate of the ring or wheel. This circuitous path is provided in order that the relay of a called or passive line may be cut out, so as to reduce resistance, but principally to prevent such relay from being operated by the current of the operating-line. The cut out is effected by the following-described means:

The contact-frames consist each of a pivoted metal bar or shaft, H, journaled in insulated bearings at the top and bottom of the machine, having radial metallic arms $h\ h'$, holding a slender rod, $h^2$, which is the contact-bar proper or the medium of engagement with the trippers.

Attached to the pivoted shaft H, near its lower end, is a metal arm or brush, $h^3$, or, preferably, two connected brushes, insulated from the shaft, and bridging a pair of insulated segments of metal, $h^4\ h^5$, the outer one longer than the inner. The direct line leads to the outer or longer segment. Circuit is thence by brush $h^3$ to the inner segment, $h^4$, and thence to the relay.

H' is another metallic arm or contact-spring, attached to but in circuit with the shaft H, and so arranged that when the frame is swung to its limit it contacts with a pin, $i$, rising from the outer segment, the brush $h^3$ at the same time leaving the inner segment and breaking the connection of the two. Thus when a contact-frame is engaged the circuit with its line is made directly from the outer segment to the line without passing through the relay, the latter being in the branch circuit, connected permanently with the inner or shorter segment.

It has been explained that when a contact-frame is swung out to its limit and engaged by a tripper the tripper of another line will pass by without contacting or obtaining engagement therewith, thus preventing disturbance of the communication through the frame of the called line. Engagement, however, with the frame of an operating-line is not thus provided against, but such provision is necessary to prevent the operating-line from being broken. For this purpose each contact-frame is furnished with an arm, K, supporting an anti-friction roller, $k$, which rides on the periphery of the insulated filling of the ring of the same line. A cam-recess, $k'$, in said filling adjacent to the tripper receives said roller when the ring is home; but as the latter begins to move the wheel is pressed outward from the periphery of the insulator. By this operation the contact-frame of the operating-line is swung out on its pivotal points sufficiently to avoid contact of passing trippers, but not far enough to break the circuit through the segments. It is therefore only when a line is at home that its contact-frame can be caught. The term "home" is used to indicate the normal position of the tripper—that is, when it coincides with the contact-frame of the line to which it belongs or pertains. A contact-frame, however, is not to be pushed out by its own line-tripper, otherwise the tripper of another line could not engage it. To avoid such a difficulty each contact-bar is notched or recessed at a point opposite or on the plane of its line-tripper, so that when the latter is home it projects into said notch or recess and does not touch the bar.

As will be seen, the planes of the contact-frames are oblique with reference to the circumferential lines of the rings; but this arrangement is arbitrary, and need not be adhered to. The frames are normally maintained in proper relation to the rings, and after being swung outward and released are retracted by means of the springs L, suitably arranged. These springs also serve to keep the tripper and contact rods in close and reliable impingement.

*Local subscriber's station apparatus.*—As has been stated, the operations of the central line-connecting apparatus are responsive to electrical impulses sent over the lines from the local or subscribers' stations. These impulses are produced by the intermittent closing of a normally-open battery-circuit, which correspondingly closes the relay at the central apparatus, and thus brings into action the power whereby the mechanical switching operations are performed. Each local or subscriber's station for this purpose is furnished with an independent battery or generator, which has one pole grounded or in connection with a return circuit or wire common to all the lines. The local subscriber's station apparatus for giving control of the central devices pertaining to a given line are for convenience inclosed in a box or case, P, to which are connected, if desired, the necessary devices belonging to the usual telephonic transmitter and receiver, which need not be particularly described. From the battery the line and ground conductors lead, as shown, to a reversing-key, N, which is carried by a toothed disk or wheel, $m'$, the teeth of which correspond in number with the number of impulses necessary to effect a complete revolution at the central office of the carrier of a contacting finger or tripper. The disk or wheel is caused to rotate by suitable clock-work mechanism, and its teeth successively pass a contacting spring or arm, $M^3$, which completes or closes the open line-circuit and sends an impulse therethrough. The disk or wheel $m'$ is covered by a dial, $M^2$, upon which the several lines of the exchange are indicated by suitable numbers or letters at regular intervals, completing the circle. Holes are bored through this dial in coincidence with said numbers or letters for the reception of a transferable pin or plug, $m^3$. A stud, $m^4$, on the disk or wheel comes in contact with this pin on open circuit and arrests the movement of said wheel at any given number opposite said pin, whereupon the operations of the devices pertaining to the operating-line at the central apparatus cease, the operating-line being then in coincidence and circuit with the line at whose number or letter the pin is placed. To provide for a reversal of the current after such circulating has been effected the line and ground wires from the local station-battery lead to the reversing-key through brushes $m^5$, touching insulated collars on the disk-shaft. Said key has an elongated arm, $m^7$, which, as the disk comes to a stop, touches and bears against the inserting or stop pin when the same is at any but its home position. Under such conditions the direction of the current while the disk is rotating is such as will effect the operation of the relay; but when the arm of the reversing-key strikes the pin the direction of the current is reversed. It will be observed, however, that the hole for the reception of the pin when at home—*i. e.*, at the number on the disk or dial of the station to which it belongs—is out of the circle of the other holes. Hence when the disk arrives home the arm of the reversing-key does not strike the pin, so that no reversal then takes place.

The object of the reversal is to provide for calling a distant station by an operating-line without operating the relay of the latter. This calling is performed under the reversed current by means of a circuit-closing key or push-pin, Q, in a branch or shunt line, which is normally open, and only to be closed when the circuit-closing wheel is at rest and the main circuit open. Now, when a line is at "home" and its pin in a home position it is in a condition to be engaged with and called, but at no other time is it in such condition. Then when a calling-current is received the relay of the called line is cut out, as previously explained, so that the calling-current cannot affect it, as it otherwise would, the direction being suited to such operation. Now, having been called, a call is returned from a distant station by simply pressing the push-button at the latter. The return call-current is then in the normal direction—i. e., in the direction under which the called-line relay would operate were it in circuit—but it is in the reverse direction relatively to the relay of the calling-line, or in the same direction as the calling-current of the latter, and hence has no effect on said relay. This automatic method of reversing the current is desired so as to obviate the possibility of mistake in making and returning calls, growing out of the necessity in calling up a line and returning a call, of having the currents in the same direction, notwithstanding the peculiar relations of the two lines, the one operative and the other passive. But for such automatic contrivance relieving the callers of the necessity of exercising selection in manipulating their calls it would be required to provide an independent reversing-key, which the caller would have to shift after obtaining a line, while the called must leave it alone. In this case, if the caller were to accidentally or inadvertently omit such shifting, he would operate his relay, while if the called subscriber should shift his reversing-key he would also operate the caller's relay, and so destroy the conditions obtained at the central apparatus, as well as the unison of local indicators and central devices. The calls are sounded upon bells or gongs having suitable electro-magnetic sounders in circuit with the main lines.

In describing the operations of the central and local stations we have referred to batteries or generators; but we do not wish to be understood as limiting ourselves to any specific generator—such as a voltaic battery—as we may employ magneto-electric currents for all or any of the operations dependent upon an electric current.

In Letters Patent granted to us December 9, 1879, No. 222,458, a method was described and means were shown for automatically effecting the connection at a central station or exchange of converging normally-disconnected lines. According to such method and means, a line being selected and contact made therewith, a circuit was established with the seeking line by reversing the working-current. This operation had triple effects—viz., the cutting out of the ground for the working-line, the drawing out of its normal position of the contacted bar of the sought line, and the sounding of an alarm at the sought station. In the present application, however, the cutting out of the ground and the movement of the contact-bar of the called line out of the path of contact of the trippers or connecting devices of other seeking lines is accomplished, as already described, without reversing the current, the reverse current now being used merely to sound the alarm. Nor is it necessary to use a reverse current for this purpose, as an alarm may be effected by a current of the same direction as the relay-working current, but weaker than the latter, so as to be incapable of working the relay. A magneto-current from a suitable generator may be substituted for the battery-current to produce an alarm. In said Letters Patent it was proposed to work the connecting mechanism at the central station directly by currents sent from the local stations or subscribers' boxes. In practice, however, the resistance in the lines was found a serious obstacle to efficient working unless the local or subscribers' batteries were augmented to an inconvenient extent. Accordingly in the present case the motive power (consisting of a main battery or dynamo-electric machine and motor or equivalent mechanical operating devices) for working the central-office connecting mechanism is located at the central station, and is thrown on through the medium of relays controlled by the subscribers. Under this arrangement subscribers require only sufficient battery-power to work the relay and sound an alarm, and not enough to directly actuate the connecting devices.

The operations required by a subscriber or at local station are as follows: Pull out the pin which passes through his dial and insert at a number on said dial corresponding to that of the subscriber sought. When box-wheel stops push in the call-button to sound the alarm. On receiving an answering alarm take telephone off hook and converse. Conversation being ended, restore telephone to hook, withdraw the dial-pin, and reinsert in home position. The withdrawal of pin starts the box-wheel, and, by the means and operations already described, restores the switching mechanism at central station into normal position or brings it home.

What we claim as our invention is as follows:

1. In a telephonic exchange having a series of normally-disconnected lines grounded at the place of convergence and in circuit with connecting mechanism, the combination, with such mechanism, of a main battery or dynamo-electric machine and motor or equivalent mechanical operating devices, and suitable means for controlling said battery or dynamo-electric machine and motor or equivalent device through said lines and for effecting the necessary movements of such connecting mechanism, substantially as set forth.

2. In a telephonic exchange comprising a series of lines or conductors leading to and grounded at a central station and in circuit at such station with connecting mechanism, the combination of generators at the stations or distant termini of said lines for sending electric impulses over said lines, and a main battery or dynamo-electric machine, and motor or equivalent operating device at the central station operating responsively to impulses sent over said lines from the subscribers' or station batteries to produce the necessary movements of the connecting mechanism for the connection and disconnection of said lines, as set forth.

3. In a telephonic-exchange system comprising a series of normally-disconnected lines converging to a central station provided with mechanism for connecting said lines, said mechanism being moved by a main battery or equivalent dynamo-electric machine, and motor or equivalent operating device located at the central station and controllable by electric impulses sent from the batteries located at the remote ends or at distant points on said lines and operating through the latter, the combination, with said lines, central connecting mechanism, main and line batteries, of relays located at the central station and operated by said line-batteries to throw on the main battery and thereby effect the necessary movements of the central mechanism for connecting and disconnecting the lines, as set forth.

4. In a telephonic-exchange system comprising a series of independent lines converging to a central station provided with connecting mechanism, a main battery for operating said mechanism, relays for throwing on said battery, and line-batteries for operating said relays, switches in each line in the circuit between the line-batteries and the relays, and capable of being operated from other lines, whereby one subscriber calling another may cut out the relay of the latter, as set forth.

5. In a telephonic-exchange system comprising a series of disconnected lines converging to a common station, means at said station for connecting any two of said lines, and controllable from the distant stations, and relays in said lines for admitting current to operative devices at said central station, a switch or shunt located between the relay and the connecting mechanism and operated automatically by a calling or seeking member, substantially as described, whereby the relay of a sought line is temporarily cut out.

6. The combination, in a telephone-exchange or electric line-connecting apparatus, of a series of conductors normally grounded at a central or common station, each of said conductors having in circuit a relay, an engaging finger sustained on a ring or traveler, a ground and line switch all in circuit, and a movable section or contact bar normally out of circuit but carrying said switch, whereby when a given line is worked for calling or connecting its finger will be carried into engagement with the contact-bar of another line, the grounds of both lines being thereby broken, the calling-line through the movement of its finger and the other through the movement of its switch, the lines connected and a through circuit established over both, substantially as described.

7. The combination, in a telephone-exchange or line-connecting apparatus, of a relay adapted to respond to currents sent over a line in circuit therewith, a battery connected with said relay so as to be thrown onto a short independent line when said relay is closed, an electro-magnet in circuit with such battery, a step-by-step progressive movement connected with the armature of said magnet, a wheel or traveler in circuit with the relay-line, but arranged to be moved by said step-by-step progressive movement, whereby when a working-current is sent over said line through said relay the battery is thrown onto the short line and the wheel or traveler caused to move and carry the finger along, substantially as specified.

8. The combination, in a telephone-exchange or electrical line-connecting apparatus, of a series of relays and switching devices normally in circuit therewith and arranged to operate substantially as described, whereby when two lines are connected through the medium of such connecting apparatus the relay of a sought or called line will be cut out, while the relay of the calling or seeking line will remain in circuit, substantially as set forth.

9. The combination, in an automatic line-connecting apparatus, with the switching or connecting devices and their operative mechanism, of relays constantly in the path or circuit of the calling-lines, to provide for the restoration to normal of said calling-line.

10. In a telephonic-exchange apparatus, a movable finger normally in circuit with the ground at a central exchange or connecting device and forming a portion of the circuit of a line leading from a distant station to such central exchange, said finger being mounted on a ring or carrier and adapted and designed, when its carrier is moved, to come in contact with sections or bars forming parts of other conductors or lines and by such contact to break its normal ground and secure circuit to ground at another distant station over the contacted line, substantially as set forth.

11. In a telephonic-exchange apparatus, a movable conductor pertaining to a given line and normally out of circuit, in combination with devices, as set forth, whereby the movement of said conductor by a calling-line breaks the normal or central ground of its own line and establishes circuit between the two lines, substantially as set forth.

12. In a telephonic-exchange line-connecting apparatus, a relay, in combination with a switching device which normally completes circuit to ground at central station through said relay, and which upon being duly moved, substantially as described, cuts out such ground and leaves a called line in unbroken or continuous circuit with the calling-line, as specified.

13. In a telephone-exchange apparatus having conducting-fingers which are caused to travel in the act of establishing coincidence of lines and to come into contact with movable conductors in the path thereof, means, substantially as described, whereby the movable conductor of a given line is shifted out of said path, when the traveling conductor or finger of the line to which it pertains has left home.

14. In a telephonic line-connecting apparatus, and in combination with the lines or conductors leading into and out of said apparatus, receiving-conductors or contact-bars in circuit therewith and arranged, substantially as described, so that they may be moved by the conducting-finger of any line and isolated thereby from possible contact of other conducting-fingers.

15. In a telephonic apparatus, a receiving-conductor through which circuit may be made from a calling to a called line, said conductor being constructed and arranged substantially as described, whereby when the line to which it pertains is employed in seeking or effecting coincidence or connection with another line, such conductor will be shifted beyond the reach of the other operating-lines or their traveling contact devices.

16. In a telephonic-exchange apparatus adapted for automatic circuiting purposes, the combination of the following elements, viz: a traveling circuiting finger, stud, or contact device normally grounded in circuit with a telephonic line, mechanism for causing said circuiting-finger to travel, a relay to bring said mechanism into action, a switch between said finger and a distant line-terminal for effecting diversion of circuit from ground through another line, and a movable conductor coinciding with the home or normal position of said finger.

17. In a telephonic or telegraphic line-connecting apparatus, the combination, with a series of parallel travelers carrying conducting-fingers normally grounding the respective lines leading thereto, of a corresponding series of receptive conductors traversing said travelers at intervals, and adapted for engagement of the fingers, said travelers and fingers being adapted and designed to move transversely to said receptive conductors, the latter being constructed and arranged to swing or be moved by contact of said fingers, whereby any finger may engage with any disengaged traversing conductor but that pertaining to its own line, shift the same out of path of the other fingers, switch said receiving-conductor into circuit with its line, and break the central ground of both lines.

18. The combination of a series of lines grounded at subscribers' or distant stations and at a central exchange, (or a station common to all,) batteries at each independent station and at the central station, a switch or connecting mechanism at the central station actuated by battery thereat, and operating responsive to currents sent from the batteries at the independent local stations to cut out the grounds of any two lines (or all of the lines in pairs) at the central station, and to restore the same, substantially as set forth.

19. In a telephonic exchange, the combination, with a traveling carrier, of a contact piece or finger normally in circuit with ground or a return wire, and operating to change said circuit to a different line by impingement against another conductor.

20. A device for actuating an automatic circuit-changer, and for receiving and sending alarm-signals, consisting of a make-and-break mechanism, an automatic pole-changer or reversing-key, and an electric bell, substantially as shown and described, whereby a central switch mechanism may be operated to effect connection of normally-independent lines, and when such connection is effected alarms may be sent and received without disturbing said switch mechanism.

21. The combination, with switch mechanism for effecting connection of normally-independent lines, of a polarized relay at a central station and make-and-break mechanisms, an automatic pole-changer or reversing-key, and an electric bell at subscribers' stations, whereby when such switch mechanism has been actuated to the desired extent for effecting the connection of lines the direction of current from the make-and-break mechanism is automatically reversed to enable an alarm to be sent therefrom over the line without actuating the relay in circuit, substantially as shown and set forth.

In testimony that we claim the foregoing we have hereunto subscribed our names.

M. DANL. CONNOLLY.
THOS. A. CONNOLLY.
THOMAS J. McTIGHE.

Witnesses to signature of M. D. Connolly:
CHAS. F. VAN HORN,
EDWIN PARAMOUR.
Witnesses to signature of T. A. Connolly:
LEWIS SANDERSON,
WILLIAM CROSS.
Witnesses to signature of T. J. McTighe:
J. C. BAILEY,
A. J. SANSOM.